(12) United States Patent
Bouvet et al.

(10) Patent No.: US 10,834,052 B2
(45) Date of Patent: Nov. 10, 2020

(54) MONITORING DEVICE AND METHOD IMPLEMENTED BY AN ACCESS POINT FOR A TELECOMMUNICATIONS NETWORK

(71) Applicant: Orange, Paris (FR)

(72) Inventors: Bertrand Bouvet, Châtillon (FR); Stéphane Boizard, Châtillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/469,912

(22) PCT Filed: Dec. 13, 2017

(86) PCT No.: PCT/FR2017/053541
§ 371 (c)(1),
(2) Date: Jun. 14, 2019

(87) PCT Pub. No.: WO2018/109377
PCT Pub. Date: Jun. 21, 2018

(65) Prior Publication Data
US 2019/0319924 A1 Oct. 17, 2019

(30) Foreign Application Priority Data
Dec. 16, 2016 (FR) ..................................... 16 62696

(51) Int. Cl.
*H04W 12/12* (2009.01)
*H04L 29/06* (2006.01)
*H04L 29/12* (2006.01)

(52) U.S. Cl.
CPC ...... *H04L 63/0254* (2013.01); *H04L 61/2514* (2013.01); *H04L 61/2517* (2013.01);
(Continued)

(58) Field of Classification Search
None
See application file for complete search history.

(56) References Cited

U.S. PATENT DOCUMENTS 8,397,284 B2 * 3/2013 Kommareddy ..... H04L 63/1458 726/13
2003/0154399 A1 * 8/2003 Zuk ..................... H04L 63/1416 726/11
(Continued)

FOREIGN PATENT DOCUMENTS

FR 2 902 905 A1 12/2007
GB 2 421 156 A 6/2006
WO WO 2014/128256 A1 8/2014

OTHER PUBLICATIONS

International Search Report and Written Opinion dated Mar. 1, 2018 for Application No. PCT/FR2017/053541.

*Primary Examiner* — Ayanah S George
(74) *Attorney, Agent, or Firm* — Knobbe, Martens, Olson & Bear, LLP

(57) ABSTRACT

A monitoring method implemented by an access point for a network that can maintain an address association table is described. The method can include selecting at least two entries in the address association table, storing at least one predetermined characteristic obtained over a predefined period of time for each inflow and each outflow associated with the selected entries, and comparing, for at least one pair of selected entries, at least one stored characteristic for an inflow associated with one of the entries of the pair with the at least one corresponding stored characteristic for an outflow associated with the other entry of the pair. If, for at least one pair of entries, the comparison step indicates that an inflow associated with one of the entries of the pair transports an application content of the same nature as an outflow associated with the other entry of the pair, a risk of fraud can be detected.

15 Claims, 5 Drawing Sheets

(52) U.S. Cl.
CPC .......... *H04L 63/029* (2013.01); *H04L 63/145* (2013.01); *H04L 63/1425* (2013.01); *H04W 12/1208* (2019.01)

(56) References Cited

U.S. PATENT DOCUMENTS

2008/0028467 A1    1/2008    Kommareddy et al.
2016/0261611 A1    9/2016    Heilig \* cited by examiner

| | @ IP LAN | PORT LAN | PROT | @ IP WAN | PORT WAN |
|---|---|---|---|---|---|
| IN1 | @ IPT1 | PTT1a | UDP | @ IP WAN11 | PT WAN11a |
| IN2 | @ IPT1 | PTT1b | TCP | @ IP WAN11 | PT WAN11b |
| IN3 | @ IPT2 | PTT2a | UDP | @ IP WAN11 | PT WAN11c |

NAPT 12

AP11

MONITORING DEVICE AND METHOD IMPLEMENTED BY AN ACCESS POINT FOR A TELECOMMUNICATIONS NETWORK

RELATED APPLICATIONS

This application is the U.S. National Phase of Application No. PCT/FR2017/053541 entitled "MONITORING DEVICE AND METHOD IMPLEMENTED BY AN ACCESS POINT FOR A TELECOMMUNICATIONS NETWORK" and filed Dec. 13, 2017, which claims the benefit of French Patent Application No. 1662696, filed Dec. 16, 2016, each of which is incorporated by reference in its entirety.

BACKGROUND OF THE INVENTION

The invention relates to the general field of telecommunications.

It relates more particularly to the detection of frauds likely to affect a telecommunications network having one or more access points.

There is no limitation as to the nature of the access to the telecommunications network. It can be a fixed network of ADSL (Asymmetric Digital Subscriber Line), VDSL (Very high bit rate Digital Subscriber Line), or optical fiber type, or even a cable network for which the access point can in particular be a gateway also commonly referred to as "box"; it can, as a variant, be a mobile network of WIFI (Wireless Fidelity) or 2G/3G/4G/5G type, for which the access point can then be a dongle or a smartphone configured as access point, etc.

As is known, an access point to a telecommunications network obtains, statically or dynamically, when it is started up, at least one IP address referred to as public (which can be a private IP address in certain cases/services) or external on the network allowing it to access the services offered by the latter, such as, for example, access to the Internet or to an Intranet, access to a telephony service, etc. This public IP address assigned to the access point is conventionally associated to the WAN (Wide Area Network) port thereof.

The access point also itself supplies, to the item of equipments which are connected to it via a local area network (or LAN), IP addresses that are referred to as private or internal on this local area network, for example via a DHCP (Dynamic Host Configuration Protocol) server internal to the access point. However, these private IP addresses which are internal to the local area network cannot be used to access services offered by the telecommunications network WAN. Note that, hereinafter in the description, the terminology "WAN network" is used to generally designate the external network to which the access point allows access as opposed to its local area network. There is however no limitation as to the nature of this network (public or private network, etc.).

To allow an item of equipment of the local area network to connect to an external service offered by the telecommunications network WAN, or to receive flows originating from the telecommunications network WAN, the access point maintains and uses an address association table, also called NAPT (Network Address and Port Translation) table. Each entry of this table associates multiple items of information with one another, namely, in particular:

the private IP address assigned to the item of equipment on the local area network;
the public IP address assigned to the access point on at least one of its WAN interfaces;
the private port number used by the item of equipment on the local area network;
the public port number (WAN port) used by the access point to communicate over the external network; and
a transport protocol (e.g. TCP, UDP, SCTP, etc.) for the flows sent and received by the item of equipment.

This NAPT table is used by the access point to route, in bidirectional mode, flows conveying IP packets between the items of equipment of the local area network and items of equipment or devices of the WAN network. Thus, when an IP packet is received by the access point from the external network, the latter compares the IP address and the destination port of the received IP packet with the content of the entries in the NAPT table. If the NAPT table contains an entry for which the public IP address and the public port number coincide with the IP address and the destination port of the received IP packet, it replaces the IP address and the destination port of the received IP packet with the private IP address and the private port associated with this entry. Then, the IP packet is routed over the local area network.

Similarly, when an IP packet is sent by an item of equipment of the local area network to an item of equipment of the WAN network, the access point compares the source IP address and the source port of the received IP packet with the entries of the NAPT table so as to identify the associated public IP address and public port. Then, the source IP address and the source port of the IP packet are replaced by the access point with the identified public IP address and public port. The packet is then routed over the external WAN network.

It should be noted that only the flows coming from the items of equipment of the local area network can trigger the creation of an entry in the NAPT table. In other words, to authorize bidirectional exchanges of data between an item of equipment of the local area network of the access point and an item of equipment of the WAN network to which the access point allows access, it is mandatory for the first exchange between these two items of equipment to be initiated by the item of equipment of the local area network in order for an entry to be created in the NAPT table allowing the local area network to be connected with the WAN network. Under no circumstances is the creation of an entry in the NAPT table possible if the first exchange is initiated by the item of equipment of the WAN network.

Other local area network protection mechanisms can be envisaged at the access point level, such as, for example, the use of a firewall function to secure the access point via predefined rules, or of a parental control function making it possible to create rules of connectivity or of access to services offered by the external network (e.g. inclusion of certain addresses (URL, Uniform Resource Locator) on a black list, etc.).

These mechanisms are however ineffective with respect to certain frauds and in particular the frauds which consist in hacking items of equipment of the local area network of a user in order to spoof his or her identity and access different services offered by the WAN network at his or her cost.

An example of such a fraud is illustrated with reference to FIG. 1 and described briefly hereinbelow.

It is assumed that a computer hacker has managed to install on the terminal 1 of a user so-called hacking software LOG1. This terminal 1 is connected to a local area network LAN comprising an access point 2 (e.g. a "box") to a WAN network such as, for example, the public Internet network. The access point 2 maintains, as mentioned previously, an address association table NAPT2.

The software LOG1 is so-called tunneling software, which is used by the computer hacker to open ports on the access point 2. It is assumed that it is activated each time the terminal 1 is booted up, and that, following this activation, it is configured to connect to a server 3 ("hacker"), which is itself connected to the Internet network (steps E1 and E2). This connection creates a new entry IN1 in the table NAPT2.

On its side, the computer hacker also activates, on his or her terminal 4, tunneling software LOG4 which connects to the server 3 (step E3). Upon this connection, the terminal 4 supplies to the server 3 its IP address and its port number on which it listens to the network.

The server 3 then supplies the connectivity information (IP address and port) of the terminal 4 to the software LOG1 installed on the terminal 1 of the hacked user (step E4). The flow transporting this information is authorized to re-enter the LAN network at the access point 2 since an entry IN1 in the table NAPT2 has been previously created, at the initiative of the terminal 1 to the server 3.

The hacking software LOG1 present on the terminal 1 then requests the setting up of a tunnel with the terminal 4 of the computer hacker on the basis of the connectivity information received from the server 3 (steps E5 and E6). This request sent to the terminal 4 creates a new entry IN2 in the table NAPT2 maintained by the access point 2.

A tunnel is then set up between the terminal 1 and the terminal 4.

Following the setting up of this tunnel, the computer hacker activates, for example, Voice-over-IP software LOGVoIP4 installed on his or her terminal 4, allowing him or her to communicate over the network of a VoIP telephony operator to which the user of the terminal 1 is a subscriber. The software LOGVoIP4, after it has been launched, sends, to a device management platform 5 of the telephony operator, a request comprising a configuration file query (step E7).

This request is encapsulated in the tunnel set up between the terminal 4 and the terminal 1, and is routed to the terminal 1, benefitting from the entry IN2 previously created in the table NAPT2.

On reception of the request encapsulated in the tunnel, the terminal 1 de-encapsulates the request then sends it to the device management platform 5 of the telephony operator (steps E8, E9). This sending creates a new entry IN3 in the table NAPT2 of the access point 2.

The device management platform 5 recovers the source IP address of the request (public IP address of the access point 2), and carries out the usual checks allowing it to confirm that the user of the terminal 1 is indeed a subscriber to the VoIP telephony service. Following this confirmation, it generates the requested configuration file, then returns it to the terminal 1 (step E10). The response from the device management platform 5 is routed to the terminal 1 using the entry IN3 previously created in the table NAPT2.

Then, it is returned by the terminal 1 to the terminal 4 via the tunnel set up between the two terminals (step E11). The configuration file is supplied to the software LOGVoIP4. The latter can thus connect to the network of the VoIP telephony operator with the configuration information of the terminal 1.

According to the same principle as in the step E7, the software LOGVoIP4 connects to the core network 6 of the VoIP telephony operator to be registered, by using the configuration information received (steps E12, E13, E14). The associated SIP signaling creates a new entry IN4 in the table NAPT2 of the access point 2. Once registered with the core network 6, the computer hacker can make calls (for example premium rate) by using the account of the hacked user.

Today, in the state of the art, there are unfortunately no effective mechanisms to make it possible to safeguard against this kind of fraud which is based on IP flow bounce on the terminals of the hacked users.

OBJECT AND SUMMARY OF THE INVENTION

The invention aims in particular to overcome this problem by proposing a method that makes it possible to secure both fixed and mobile telecommunications networks at the access points of these networks. This method proposes an advantageous technique that makes it possible to detect, at the access points, data flows that are likely to be associated with hacking exploiting the IP flow bounce mechanisms, consequently offering the possibility of having a wide panel of corrective actions for curbing this hacking.

More specifically, the invention proposes a monitoring method intended to be implemented by an access point to a telecommunications network, this access point being able to maintain an address association table comprising at least one entry associating a public transport address with a private transport address, each transport address comprising an IP address and a port, the monitoring method comprising:

a step of selection of at least two entries in the address association table;

a step of memorizing of at least one predetermined characteristic obtained over a predefined period of time for each incoming flow and each outgoing flow associated with the selected entries;

a step of comparison, for at least one pair of selected entries, of at least one characteristic memorized for an incoming flow associated with one of the entries of the pair with said at least one corresponding characteristic memorized for an outgoing flow associated with the other entry of the pair; and if, for at least one pair of entries, the result of the comparison step is that an incoming flow associated with one of the entries of the pair transports an application content of the same kind as an outgoing flow associated with the other entry of the pair, a step of detection of a risk of fraud.

By correlation, the invention also targets an access point to a telecommunications network, capable of maintaining an address association table comprising at least one entry associating a public transport address on said network with a private transport address, each transport address comprising an IP address and a port, said access point comprising:

a selection module configured to select at least two entries in the address association table;

a memorizing module configured to memorize at least one predetermined characteristic obtained over a predefined time period for each incoming flow and each outgoing flow associated with the selected entries;

a comparison module, activated for at least one pair of selected entries, and configured to compare at least one characteristic memorized for an incoming flow associated with one of the entries of the pair with said at least one corresponding characteristic memorized for an outgoing flow associated with the other entry of the pair; and a detection module for detecting a risk of fraud, activated if, for at least one pair of entries, the comparison module determines that an incoming flow associated with one of the entries of the pair transports an application content of the same kind as an outgoing flow associated with the other entry of the pair.

There is no limitation as to the type of application content considered; it can be Voice over IP, FTP downloading, viewing a video stream of TV/VOD (Video on Demand) type, interactions on a network game, access to a streaming flow, to a mailbox, to a DNS (Domain Name System) server, etc.

The solution proposed by the invention therefore consists in exploiting the address association table maintained by the access point and in detecting incoming and outgoing data flows associated with the entries of this address association table that have similar or identical traffic profiles over one and the same time window (in other words, transporting an application content of the same type, such as, for example, Voice over IP generated from one and the same application, FTP download of one and the same application content, etc.). This time window is of limited duration, typically a few seconds, even a few tens of seconds.

There is no limitation as to the nature or the number of the characteristics examined to determine whether flows are transporting the same type of application content, in other words the same type of traffic (e.g. Voice over IP, FTP downloading), from the same application, and/or transporting similar application data, that is to say data having equivalent or corresponding characteristics (of traffic in particular, such as a number of packets, a periodicity, etc.).

Thus, for example, said at least one characteristic memorized for a flow can comprise at least one characteristic out of:

an application protocol (e.g. VoIP, FTP, HTTP, SMTP, DNS, etc.), used by the flow during the predefined time period;
an application signature corresponding to the application content conveyed by the flow during the predefined time period;
a number of data packets conveyed by the flow during the predefined time period;
a size of data packets conveyed by the flow during the predefined time period; and
a periodicity of the data packets conveyed by the flow over the predefined time period.

Obviously, this list of characteristics is not exhaustive and other characteristics in addition to or instead of the preceding ones can be considered, such as, for example, an item of service differentiation information present in the header of the data packets conveyed by the flow (e.g. DSCP (Differentiated Service Code Points) marking of the IP data packet headers).

It should also be noted that certain characteristics can by themselves be discriminatory for determining whether one and the same type of application content is transported in an incoming flow and in an outgoing flow that are associated with two distinct entries of the table. Such is the case, for example, of the application signature for certain application protocols (e.g. Voice over IP protocol) which, when it coincides for the two compared flows, is sufficient to determine that one and the same type of application content (e.g. Voice over IP generated from the Skype™ Voice over IP application) is conveyed by the two flows.

On the other hand, other characteristics must be combined with one another and it is the coinciding of the combination of these characteristics which allows the access point to identify application contents of the same kind conveyed by two incoming and outgoing flows associated with two distinct entries of the address association table. Depending on the characteristics considered, the coincidence (or correspondence) of the latter can be manifested somewhat differently. It may be, for example, an identical match correspondence (e.g. identical application protocols) or a similarity to within a tolerance factor. Furthermore, to examine this coincidence or to determine the characteristics that are themselves memorized, it may prove necessary to take account of a possible fragmentation of the packets or of a possible time offset between the incoming and outgoing flows.

The inventors have found that the presence of entries in the NAPT table having incoming and outgoing flows exhibiting similar application content profiles is relatively rare in the case of conventional use of an access point. This presence does on the other hand more often than not reflect the existence of frauds exploiting IP flow bounce mechanisms as described previously, and which are manifested by the almost identical outbound return of flows received by an item of equipment of a local area network. The invention therefore proposes exploiting this property of the incoming and outgoing flows in the presence of fraud to be able to detect such a situation and be capable, where appropriate, of providing a detailed response to it (e.g. alerting the user of the local area network to allow him or her for example to search for the presence of hacking software on his or her equipment, block the flows, etc.). By virtue of the invention, the security of the networks can be enhanced, simply and effectively.

Note that the invention can advantageously be applied in numerous cases. Thus, it is applied independently of the number of public IP addresses allocated to the access point on the WAN network; it is in fact commonplace for the access point to be assigned a public IP address for each service offered, e.g. a public IP address for access to the Internet, a public IP address for the Voice over IP services, a public IP address for television, etc. In such a context, the pairwise comparison of the entries of the address association table makes it possible to take account of the plurality of public IP addresses allocated to the access point and to detect the use of IP bounce mechanisms as described previously.

The invention applies also in the cases where several bounces are implemented within the local area network: for example, the application content is received on a first terminal of the local area network which returns it to a second terminal of the local area network, which can then in turn either return it to a third terminal of the local area network, or outward via a WAN interface of the access point, etc. The taking into account of all of the entries of the address association table, independently of their private and public addresses, makes it possible to identify such a situation.

The invention applies also in the cases where the terminal of the local area network used as bounce terminal comprises several network interfaces on the local area network, therefore with several private IP addresses. In this case, the hacking software installed on the bounce terminal of the local area network can exploit this situation via the APIs (Application Programming Interfaces) available on the terminal, and use several interfaces to ensure the bounce with, for example, reception of the traffic on a first interface and forwarding of the same traffic via a second interface.

In the case of a single bounce in the local area network, the method of the invention can be simplified by limiting the entries for which the characteristics of the incoming and outgoing flows are memorized and compared.

More specifically, in a particular embodiment, the selection step can comprise the selection of two entries corresponding to the same private IP address in the address association table.

By correlation, the selection module of the access point can be configured to select entries corresponding to the same private IP address in the address association table.

In effect, in the case of a single bounce within the local area network, the flows which have been proven relevant to monitor and analyze to detect the presence of this bounce correspond to the same private IP address (that of the item of equipment used for the bounce): the flows are transmitted to an item of equipment of the local area network which, in turn, returns them almost identically (apart from the extraction of a tunnel if appropriate) to an external network. The taking into account of this property thus makes it possible to reduce the complexity of the method according to the invention, particularly in terms of memory but also in terms of capacity to process the characteristics of the flows stored.

In a particular embodiment, the monitoring method comprises, for at least one of the flows:

a step of extraction, from each data packet conveyed by this flow over the predefined time period, of a header and/or of at least a part of the payload data contained in the packet; and a step of determination of at least one characteristic memorized for this flow from the headers and/or the payload data extracted from the data packets conveyed by the flow.

This embodiment is particularly suitable in the presence of a tunnel (even several tunnels) between the item of equipment of the local area network used for bounce and the hacking equipment item located in the external network. It will be noted that the detection of the presence of a tunnel can be done simply by analyzing the headers and the first bytes of the payload data of the IP packets.

As mentioned previously, the detection made possible by the invention allows for detailed corrective actions to be implemented.

Thus, in a particular embodiment, the monitoring method further comprises a step of implementation of at least one corrective action in response to the detection of a risk of fraud. Said at least one corrective action can comprise, for example, at least one action out of:

a deletion in the association table of at least one of the entries of said pair of entries for which the result of the comparison step is that an incoming flow associated with one of the entries of the pair transports an application content of the same kind as an outgoing flow associated with the other entry of the pair;

a notification of the detection of the risk of fraud; and a rebooting of the access point.

Obviously, this list is not exhaustive and many other actions can be envisaged as variants.

Furthermore, before considering a corrective action, the invention proposes, in a particular embodiment, implementing a very simple process that makes it possible to confirm the existence of a fraud. More particularly, the monitoring method can further comprise, in response to a detection of a risk of fraud, and for a pair of entries for which the result of the comparison step is that an incoming flow associated with one of the entries of the pair transports an application content of the same kind as an outgoing flow associated with the other entry of the pair:

a step of insertion of at least one packet comprising a predetermined marker into said incoming flow;

a step of detection of a presence or of an absence of said at least one marked packet in said outgoing flow; and a step of confirmation of the existence of a fraud if a presence of said at least one marked packet is detected.

By correlation, the access point can further comprise modules that are activated in case of the detection of a risk of fraud by the detection module, and for a pair of entries for which the comparison module determines that an incoming flow associated with one of the entries of the pair transports an application content of the same kind as an outgoing flow associated with the other entry of the pair, these modules comprising:

an insertion module, configured to insert at least one packet comprising a predetermined marker into said incoming flow;

a checking module, configured to detect a presence or an absence of said at least one marked packet in said outgoing flow; and a confirmation module for confirming the existence of a fraud if a presence of said at least one marked packet is detected by the checking module.

This embodiment, which can be implemented very simply and quickly, makes it possible to limit the "false" detections, and avoid undertaking corrective actions unnecessarily.

This embodiment can also comprise a step of deletion of said at least one marked packet after said detection step or said confirmation step.

This deletion makes it possible to keep local to the access point the checking performed by the latter in case of detection of a risk of fraud. In this way, not only does the checking carried out not impact the nominal traffic and therefore has no potentially damaging consequences at the application level, but also, the detection of the fraud remains secret with respect to the cheats.

In a particular embodiment, the different steps of the monitoring method are determined by computer program instructions.

Consequently, the invention also targets a computer program on an information medium, this program being able to be implemented in an access point or more generally in a computer, this program comprising instructions suitable for implementing the steps of a monitoring method as described above.

This program can use any programming language, and be in the form of source code, object code, or of intermediate code between source code and object code, such as in a partially compiled form, or in any other desirable form.

The invention also targets a computer-readable information or storage medium, comprising instructions of a computer program as mentioned above.

The information or storage medium can be any entity or device capable of storing the program. For example, the medium can be a storage means, such as a ROM, for example a CD ROM or a microelectronic circuit ROM, or even a magnetic storage means, for example a hard disk.

Also, the information or storage medium can be a transmissible medium such as an electrical or optical signal, which can be routed via an electrical or optical cable, wirelessly or by other means. The program according to the invention can in particular be downloaded over a network of Internet type.

Alternatively, the information or storage medium can be an integrated circuit in which the program is incorporated, the circuit being adapted to execute or to be used in the execution of the method concerned.

It is also possible to envisage, in other embodiments, the monitoring method and the access point according to the invention having, in combination, all or some of the above-mentioned features.

BRIEF DESCRIPTION OF THE DRAWINGS

Other features and advantages of the present invention will emerge from the description given below, with reference to the attached drawings which illustrate a totally nonlimiting exemplary embodiment thereof. In the figures.

DETAILED DESCRIPTION OF THE INVENTION

Figure 1:
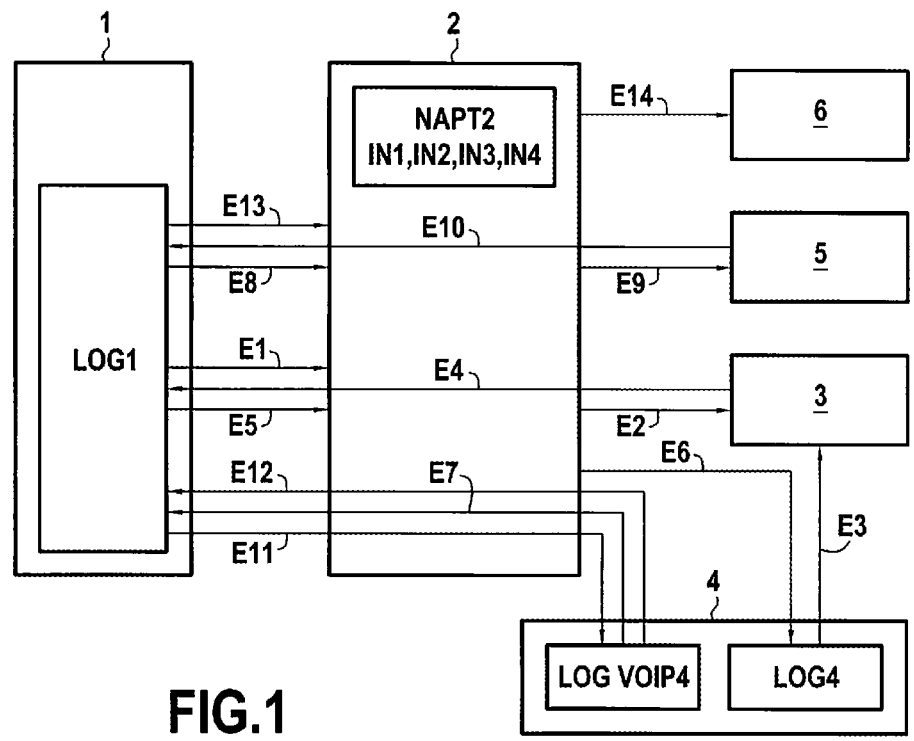
FIG. 1, already described, schematically represents an example of fraud relying on a bounce mechanism.
Figure 2:
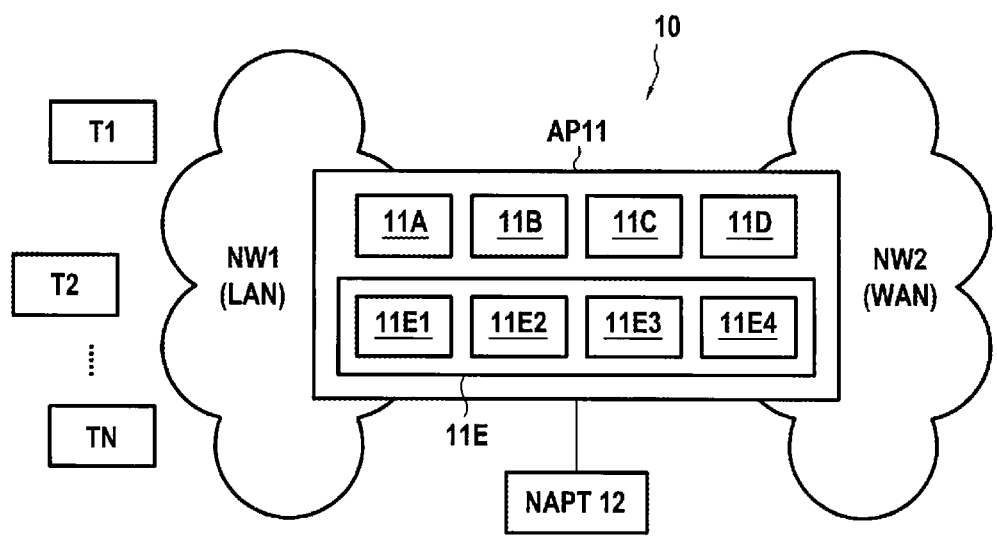
FIG. 2 represents a system comprising an access point according to the invention.

FIG. 2 represents, in its environment, a system 10 comprising a set of items of equipment T1, T2, . . . , TN, N denoting an integer greater than or equal to 1, connected to a local area network NW1, this local area network being itself connected to an external telecommunications network NW2 (also hereinafter denoted WAN network NW2) via an access point AP 11 according to the invention.

In the example considered in FIG. 2, the items of equipment T1, T2, . . . , TN are terminals (e.g. computer, smartphone, etc.) and the access point AP 11 is a home gateway of box type allowing access to the network NW2. However, there is no limitation as to the nature of the items of equipment T1, . . . , TN, or to the nature of the access point AP 11 which obviously depends on the nature of the access to the network NW2 considered. Thus, if this access is an access of 4G type, the access point AP 11 can be a dongle or a smartphone configured as access point.

The access point AP 11 here comprises various functions conventionally implemented by an access point, such as, for example, a firewall function, a dynamic IP address allocation function (DHCP function), a parental control function, etc. These functions are known in themselves and not described in detail here. Note that all the flows incoming into the local area network NW1 and outgoing from the local area network NW1 pass through the access point AP 11.

In the example considered here, a single IP address has been allocated to the access point AP 11 to communicate over the network NW2. This IP address is denoted @IPWAN11. The access point AP 11 also has a plurality of ports on its WAN interface, denoted PTWAN11a, PTWAN11b, etc.

According to the invention, the access point AP 11 comprises and keeps up to date, an address association table NAPT 12, as described previously. This table is added to by the access point 11 with a new entry each time an outgoing flow is sent by one of the terminals T1, . . . , TN of the local area network NW1 to an item of equipment (e.g. server) located on a network external to the local area network NW1, such as, typically in the network NW2 (unless, obviously, a corresponding entry already exists in the table). Note that, in accordance with current practice, no entry is created in the table NAPT 12 by a flow incoming into the LAN network NW1 from an external network. In the description, the concepts of incoming flow and outgoing flow are used with reference to the LAN network NW1, in other words, an incoming flow (understood to mean "incoming into the LAN network NW1") is a flow which comes from an item of equipment external to the LAN network NW1, and is intended for an item of equipment of the LAN network NW1, and enters the local area network via the WAN interface of the access point; an outgoing flow (understood to mean "a flow outgoing from the WAN network NW1") is a flow sent by an item of equipment of the LAN network NW1 to an item of equipment external to the LAN network NW1, and which leaves via the WAN interface of the access point.

Figures 3, 4:
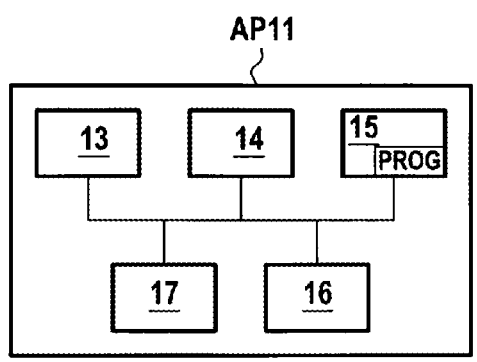
FIG. 3 illustrates an example of an address association table kept up to date by the access point of FIG. 2.
FIG. 4 schematically represents the hardware architecture of the access point of FIG. 1.

An example of NAPT table 12 maintained by the access point AP 11 is illustrated in FIG. 3. In this example, the NAPT table 12 comprises three entries IN1, IN2 and IN3, which are each quintuplets. As a variant, each entry can comprise a greater number of elements (e.g. recipient IP address and port, etc.).

Each entry comprises:
- the IP address and the port of the terminal originating the outgoing flow on the local area network (LAN) NW1, the IP address concerned being that allocated by the access point AP 11 to the terminal on the local area network NW1 (for example via its DHCP function described previously);
- the flow transport protocol (e.g. TCP, UDP, SCTP, etc.) originating the creation of the entry; and
- the IP address and the port of the access point on its WAN interface. In the example of FIG. 3, this IP address and this port correspond to the single IP address allocated to the access point AP 11 on the WAN network NW2. However, as a variant, several IP addresses can be allocated to the access point.

In other words, each entry of the table associates, with a private transport address or transport address internal to the local area network NW1 (this private transport address comprising an IP address and a port), a public or external transport address on the WAN network NW2.

As an illustration, in the example of FIG. 3:
- the entry IN1 associates, for the UDP protocol, with the IP address @IPT1 allocated to the terminal T1 by the access point AP 11 on the network NW1 and with its port PTT1a, the IP address @IPWAN11 of the access point AP 11 on the network NW2 together with the port PTWAN11a of its WAN interface;
- the entry IN2 associates, for the TCP protocol, with the IP address @IPT1 allocated to the terminal T1 by the access point AP 11 on the network NW1 and with its port PTT1b, the IP address @IPWAN11 of the access point AP 11 on the network NW2 together with the port PTWAN11b of its WAN interface; and
- the entry IN3 associates, for the UDP protocol, with the IP address @IPT2 allocated to the terminal T2 by the access point AP 11 on the network NW1 and with its port PTT2a, the IP address @IPWAN11 of the access point AP 11 on the network NW2 together with the port PTWAN11c of its WAN interface.

Note that, conventionally, the entries of the NAPT table 12 have a lifetime that is variable as a function of the transport protocol used by the flows. Thus, with the UDP protocol (so-called connectionless mode), the entry is deleted from the NAPT table 12 if no traffic is exchanged for approximately 60 s. With the TCP protocol (so-called connected mode), the entry is deleted in the NAPT table 12 as soon as the TCP session is terminated, or after approximately 45 minutes if a session is established but no traffic is detected.

In the embodiment described here, the access point AP 11 has the hardware architecture of a computer, as illustrated in FIG. 4. It comprises in particular a processor 13, a random access memory 14, a read only memory 15, a nonvolatile flash memory 16 and communication means 17 allowing it to communicate on the one hand over the local area network NW1 with the items of equipment connected to this network (and therefore with the terminals T1, . . . , TN), and on the other hand over the WAN network NW2. These communication means include, for example, a WIFI interface, a network card, etc., depending on the nature of the networks NW1 and NW2.

The read only memory 15 of the access point AP 11 constitutes a storage medium according to the invention, that can be read by the processor 13 and on which is stored, in this case, a computer program PROG according to the invention.

The computer program PROG defines functional modules (and software modules here), configured to implement the steps of the monitoring method according to the invention. These functional modules rely on and/or control the hardware elements 13-17 of the access point AP 11 cited previously. They comprise in particular here, as illustrated in FIG. 2:

- a selection module 11A configured to select entries in the address association table NAPT 12;
- a memorizing module 11B configured to memorize a predetermined characteristic obtained over a predefined time period, for each incoming flow and each outgoing flow associated with the entries selected by the selection module 11A;
- a comparison module 11C, activated for at least one pair of selected entries, and configured to compare at least one characteristic memorized by the memorizing module for an incoming flow associated with one of the entries of the pair with said at least one corresponding characteristic memorized for an outgoing flow associated with the other entry of the pair; and
- a detection module 11D for detecting a risk of fraud, activated if, for at least one pair of entries, the comparison module determines that an incoming flow associated with one of the entries of the pair transports an application content of the same kind as an outgoing flow associated with the other entry of the pair.

In the embodiment described here, the program PROG further defines a confirmation module 11E, activated by the detection module 11D when a risk of fraud is detected by the latter and for a pair of entries for which the comparison module 11C has determined that an incoming flow associated with one of the entries of the pair transports an application content of the same kind as an outgoing flow associated with the other entry of the pair. The confirmation module 11E here comprises the following (sub)modules:

- an insertion module 11E1, configured to insert at least one packet comprising a predetermined marker into said incoming flow;
- a checking module 11E2, configured to detect a presence or an absence of said at least one marked packet in said outgoing flow;
- a confirmation module 11E3 for confirming the existence of a fraud if a presence of said at least one marked packet is detected by the checking module; and
- a deletion module 11E4 for deleting said at least one marked packet at the end of the operations performed by the checking module 11E2 and/or confirmation module 11E3.

Figure 5:
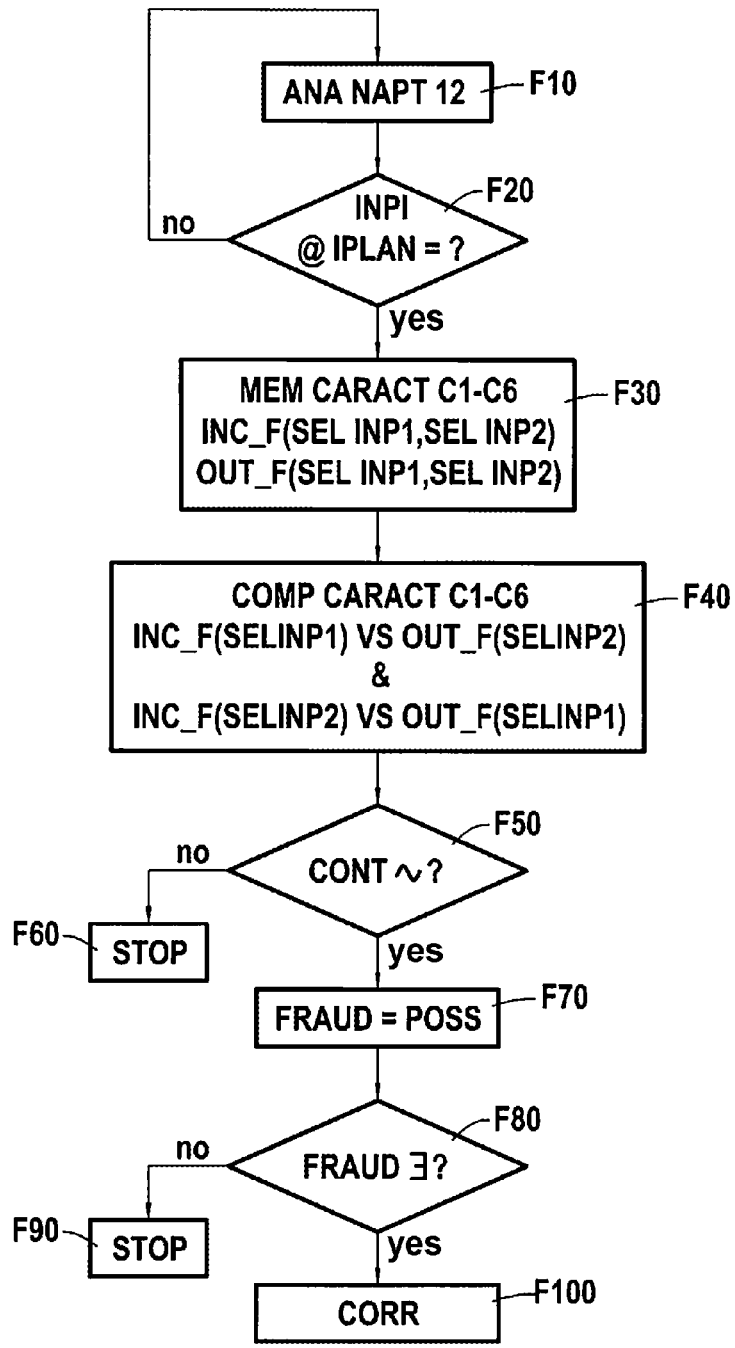
FIG. 5 illustrates, in flow diagram form, the main steps of a monitoring method according to the invention, in a particular embodiment in which it is implemented by the access point of FIG. 2.

The functions of these different modules are now described in more detail, with reference to FIG. 5, which represents, in flow diagram form, the main steps of a monitoring method according to the invention as implemented by the access point 11, in a particular embodiment of the invention.

In this embodiment, the aim is to detect a fraud based on a bounce mechanism as described previously in which a single item of equipment of the local area network NW1 (i.e. a single terminal in the example considered here) ensures a bounce function. This item of equipment is, for example here, the terminal T1 of FIG. 2. Such a bounce mechanism is reflected by the almost identical return by the terminal T1 of an incoming flow previously received from an item of equipment situated in an external network, to another item of equipment of this same external network or of another external network (apart from a de-encapsulation if the incoming flow is received in a tunnel, and/or apart from a fragmentation of the packets transported by the flows). In any case, the incoming and outgoing flows processed by the terminal T1 in the case of bounce transport an application content of the same kind (i.e. of the same type, in other words based on the same application protocol, from the same application and/or transporting similar application data, that is to say data exhibiting equivalent or corresponding characteristics (of traffic, in particular such as a number of packets, a periodicity, etc.) such as, for example, Voice over IP generated from a given application, FTP downloading data, etc.). The incoming flow arriving at the terminal T1 and the outgoing flow corresponding to the bounce on the terminal T1 of this incoming flow are also routed by the access point AP 11 from entries of the NAPT table sharing the same private IP address internal to the local area network NW1 (namely that which the access point has assigned to the terminal T1 on the local area network NW1).

In the embodiment described here, to detect a fraud based on such a bounce mechanism, the access point 11 therefore analyzes, by means of its selection module 11A, the content of its NAPT table 12 to detect the presence in this table of two distinct entries corresponding to one and the same private IP address (@IP LAN field of the NAPT table 12 illustrated in FIG. 3) (steps F10 and F20). This analysis is carried out preferentially each time a new entry is added by the access point AP 11 in the NAPT table 12 by comparing it to the existing entries of the table.

If two entries corresponding to the same private IP address are detected in the NAPT table 12 (as is the case for example of the entries IN1 and IN2 of the table illustrated in FIG. 3), the selection module 11A selects them to determine whether they are linked to a fraud. The two entries selected where appropriate in the NAPT table 12 by the selection module 11A are denoted SEL_INP1 and SEL_INP2.

The access point 11 memorizes, via its memorizing module 11B, for each incoming flow (denoted INC_F) and each outgoing flow associated with the two selected entries, at least one predetermined characteristic obtained over a predefined time period denoted T in a buffer memory (step F30). The time period T is for example taken to be equal to a few seconds or to a few tens of seconds. Note that, in the embodiment described here, in the interests of economy in terms of memory resources, the IP data packets transported by the incoming and outgoing flows corresponding to the selected entries SEL_INP1 and SEL_INP2 are not memorized at the access point AP 11. Only the characteristics obtained from the flows are memorized. The access point AP 11 uses, to this end here, a sliding window of duration T that it moves over the incoming and outgoing flows of each of the entries selected by the selection module 11A. The memorizing of the characteristics of a flow is triggered preferentially upon the starting of this flow (in other words, as soon as the entry is created in the table). The memorized characteristics are deleted from the buffer memory when the entry is deleted from the table or if the private IP address associated with this entry does not correspond to any other in the NAPT table 12.

Hereinafter in the description, the incoming flows associated respectively with the entries SELINP1 and SELINP2 are denoted INC_F(SELINP1) and INC_F(SELINP2), and the outgoing flows associated respectively with the entries SELINP1 and SELINP2 are denoted OUT_F(SELINP1) and OUT_F(SELINP2).

As mentioned previously, the memorizing module 11B determines, over the sliding window of duration T, the characteristic or characteristics sought in the monitored flows and memorizes these characteristics in the buffer memory of the access point AP. This is done independently for each of the incoming and outgoing flows of each selected entry.

It should be noted that the selection module 11A can identify, in the NAPT table 12 when it is analyzed, several distinct pairs of entries sharing the same private IP address. The access point 11 then selects and processes each of these pairs independently and in the same way as indicated here for the pair of entries (SELINP1, SELINP2).

In the embodiment described here, several characteristics of the incoming and outgoing flows are obtained over the same time window of duration T and memorized by the memorizing module 11B in the buffer memory of the access point AP 11. The aim of these characteristics is to make it possible to identify, in accordance with the invention, whether flows are conveying application contents of the same kind. They are therefore preferentially chosen so as to be representative of or at the very least make it possible to discriminate, by themselves or in combination, the types of traffic conveyed on the flows and the applications originating such traffic. To put it yet another way, these characteristics have values which depend on the application contents conveyed by the flows on which they are determined and make it possible to discriminate several application contents from one another.

In the embodiment described here, the characteristics considered comprise, for each flow considered (namely the flows INC_F(SELINP1), OUT_F(SELINP1), INC_F(SELINP2), OUT_F(SELINP2)):

a characteristic C1 representative of the application protocol used by the flow during the predefined time period of duration T;
a characteristic C2 representative of an application signature corresponding to the application content conveyed by the flow during the time period of duration T: such an application signature makes it possible, in certain cases, for certain application protocols (e.g. Voice over IP protocol) to directly recognize the nature of the application content conveyed by the flow (e.g. the Voice over IP generated by a given application);
a characteristic C3 representative of a number of data packets conveyed by the flow during the time period T;
a characteristic C4 representative of a size of data packets conveyed by the flow during the time period T;
a characteristic C5 representative of a periodicity of the data packets conveyed by the flow considered over the time period T; and
a characteristic C6 representative of an item of service differentiation information contained in the data packets conveyed by the flow.

Obviously this list is not exhaustive and other characteristics can be considered as a variant or in addition to the abovementioned characteristics. Moreover, only a part of these characteristics may also be considered.

The characteristics C1 to C6 are obtained by the memorizing module 11B from the data present in the headers of the IP packets conveyed by each of the flows monitored during the time period T and/or from the payload data transported by these packets.

Figure 6A:
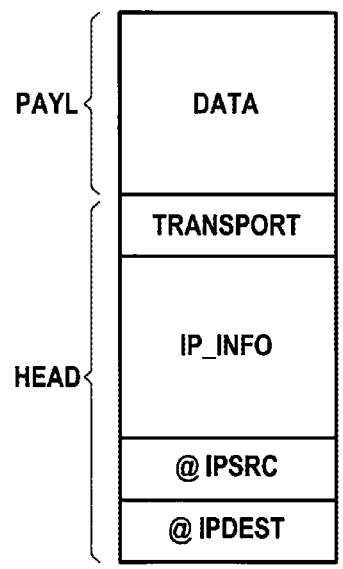
FIGS. 6A and 6B represent the format of IP data packets (encapsulated in a tunnel for FIG. 6B)
Figure 6B:
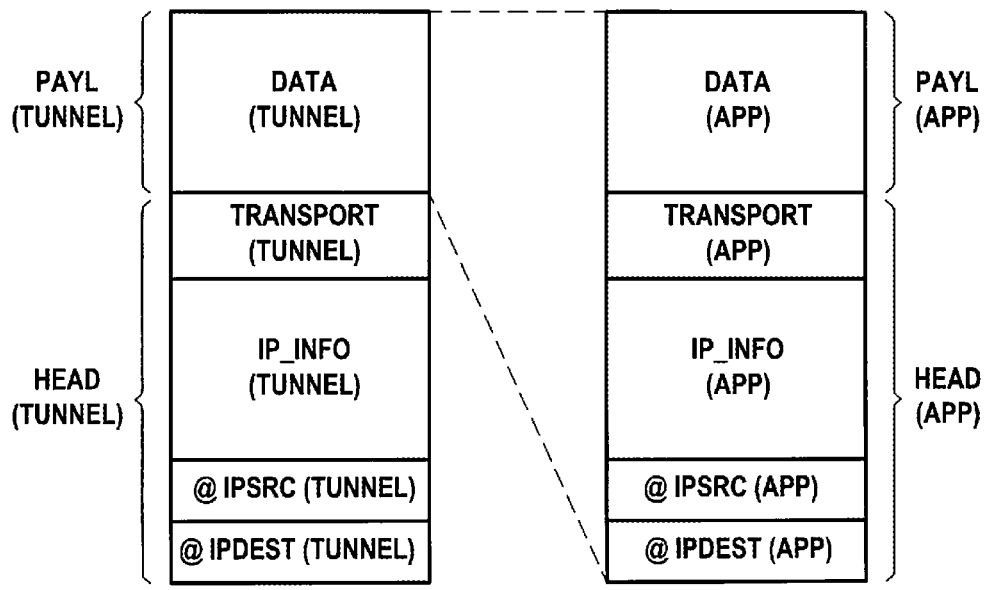

FIG. 6A schematically illustrates the format of an IP data packet conforming to the IPv4 protocol: this packet comprises, as is known, an IP header, denoted HEAD, and a so-called payload part denoted PAYL comprising several payload data bytes DATA. All or part of the payload data DATA are application payload data. They can possibly also include an IP header (having a format identical to the header HEAD) if the flow is transmitted in a tunnel for example, this header corresponding to the encapsulation of the application data packet in said tunnel, as illustrated in FIG. 6B.

The IP header HEAD comprises 20 bytes in the IPV4 version distributed according to a number of fields (or "headers"). These fields include a TRANSPORT field specifying the transport protocol used to convey the flow, an @IPSRC field containing the source IP address of the IP packet, and an @IPDEST field containing the destination IP address of the IP packet, and various fields grouped together under the reference IP_INFO containing in particular the length of the header HEAD, the total length of the packet (that is to say including the header HEAD and the payload part PAYL), the type of service affected by the packet (service differentiation information within the meaning of the invention, also called DSCP marking), the version of the IP protocol considered for the addressing (e.g. IPv4 or IPv6), the position of the frame fragment contained in the IP packet (used in case of fragmentation for reassembly), etc. These different fields and, more generally, the format of an IP packet, are known to the person skilled in the art and are not described in detail here. They are detailed in particular in the Internet protocol document IETF RFC 791.

As mentioned above, the memorizing module 11B determines the characteristics C1 to C6 of the memorized incoming and outgoing flows of the two selected entries SELINP1 and SELINP2, from the headers of the IP packets conveyed by each of the monitored flows and/or from the payload data transported by these packets. Note that, to this end, it may prove necessary for the memorizing module 11B to detect beforehand whether a tunnel encapsulating the application data is present or not. This detection can easily be implemented by the memorizing module 11B: when the IP packets conveyed by a flow are encapsulated in a tunnel, the first 20 bytes (in the case of the IPV4 protocol) of the payload part PAYL of these packets in effect themselves correspond to an IP packet header as illustrated in FIG. 6B. Consequently, by analyzing the first 20 bytes of the payload part PAYL of each IP packet memorized (part referenced PAYL(TUNNEL) in FIG. 6B), the memorizing module 11B is able to determine the presence or not of a tunnel encapsulating the application data. Note that the tunnel can be itself encapsulated in another tunnel, and so on. On detection of the presence of such a tunnel, the memorizing module 11B deletes this tunnel by de-encapsulating the IP packets, that is to say by extracting the IP header HEAD(APP) and the application payload data PAYL(APP) in FIG. 6B, from the IP packets. The characteristics C1 to C6 are then determined separately for each flow monitored from the data extracted by the module 11B.

More specifically, in the embodiment described here, for each flow monitored (incoming and/or outgoing flow of each of the selected entries of the NAPT table 12), the memorizing module 11B obtains the characteristic C1 representative of the application protocol (e.g. VoIP, FTP, etc.) used by each flow monitored from the destination port number used (which can be fixed for certain application protocols) and/or from the first payload data bytes of the packets conveyed in the flow and memorized over the time window of duration T.

As examples:
for a Voice over IP SIP application, the destination port is 5060 and the transport protocol is UDP if the size of the IP packet is smaller than 1300 bytes, TCP otherwise. Furthermore, for such an application, it should be noted that the character string "SIP/2.0" is systematically present in the first bytes of the payload data of the IP packets;
for FTP downloading, the transport protocol is TCP and the destination port is the port 21;
etc.

For each flow monitored, the memorizing module 11B here also obtains a characteristic C2 representative of an application signature corresponding to the application content conveyed by this flow. It obtains this application signature by here comparing the first bytes of the payload data DATA(APP) of each IP packet memorized for this flow (i.e. payload data after extraction, where appropriate, of the different tunnels used to encapsulate the application data) with so-called reference signatures, predetermined and contained in a reference signature database. The reference signature database is, here, stored for example in the non-volatile memory 16 of the access point AP 11. As a variant, it can be downloaded by the access point AP 11 (in particular on each update with a new reference signature corresponding to a new type of traffic).

The reference signatures stored in the database correspond to application traffic profiles: they can make it possible to identify the type of application content conveyed by a flow (e.g. Voice over IP generated by a particular application, FTP (File Transfer Protocol) file downloading data from one and the same download server, etc.). Such application traffic protocols are generally known to the network operators. They very obviously depend on the application protocol considered. Thus, for example, for an FTP file downloading service, a reference signature consists:
on the one hand, of the presence, in the payload part PAYL of the IP packets, of an expression of the type "% ftp ftp_server_name"; and
on the other hand, once the connection is effective with the ftp server, of the presence in the payload part PAYL of one of the IP packets, of an expression of the type "connected to ftp_server_name".

The memorizing module 11B therefore searches in the IP packets of the incoming and outgoing streams monitored over the time window T, to see if there is a coincidence (i.e. a similarity or a match) with one of the reference signatures stored in the reference signature database. Where appropriate, the reference signature for which the coincidence has been detected is considered to be the application signature of the flow considered. This application signature is then stored in the buffer memory.

Note that it may be that no application signature can be determined by the memorizing module 11B for a flow (for example because the reference signature database used is not complete enough). In this case, the characteristic C2 memorized reflects this incapacity.

In the embodiment described here, the memorizing module 11B also determines, for each flow considered, a characteristic C3 representing the number of IP data packets conveyed by this flow during the time period T. To this end, it uses a packet counter for each of the flows monitored.

Furthermore, a size of the IP data packets conveyed by the flow during the time window of duration T is determined by the memorizing module 11B for each flow considered. The determined size can be, for example, the minimum size of the packets, or else the maximum size of the packets or even the average size or even the distribution of sizes of the packets exchanged on each flow during the duration T. This characteristic C4 is determined from information contained in the headers of the IP data packets memorized over the duration T.

Similarly, the memorizing module 11B determines, for each flow monitored, a characteristic C5 representative of a periodicity of the data packets conveyed by the flow over the time period T. In the embodiment described here, this characteristic C5 corresponds to a minimum, maximum or average interval between the IP data packets transported by each flow. For example, for a VoIP communication managed by telecommunications operators, the data packets corresponding to the audio media flow will have a periodicity of 10 ms or 20 ms or 30 ms or 40 ms and these packets will have a fixed size.

Note that the determination of the characteristics C3 to C5 may require the taking into account of possible fragmentation of the frames transported by the flows implemented by the terminal T1 when it is used for bounce. Such a fragmentation can easily be detected by the memorizing module 11B from the header of the IP data packets transported by the flows (fragment position field described previously). On detection of such a fragmentation, the memorizing module 11B updates the characteristics C3 to C5 to reflect this fragmentation (for example, it divides the number of packets obtained for C2 by two).

Finally, in the embodiment described here, the memorizing module 11B also extracts, for each flow monitored, a characteristic C6 representative of a service differentiation information item contained in the data packets conveyed by the flow. This information is extracted from the field of the header of the IP data packets corresponding to the type of service affected by the packet. Note that, for one and the same monitored flow, this item of information is identical for all the IP data packets considered over the time period T.

The characteristics C1 to C6 thus determined by the memorizing module 11B over the time window of duration T are stored in the buffer memory of the access point 11.

Following this memorizing, the access point 11, via its comparison module 11C, compares all or some of the characteristics C1 to C6 obtained for the different flows monitored over the duration T (step F40). More specifically, it compares all or some of the characteristics C1 to C6 obtained for the incoming flow (INC_F(SELINP1), respectively INC_F(SELINP2)), of one of the entries (SELINP1, respectively SELINP2) selected in the NAPT table 12 with the corresponding characteristics C1 to C6 obtained for the outgoing flow (OUT_F(SELINP2), respectively OUT_F(SELINP1)) of the other entry (SELINP2, respectively SELINP1) selected in the NAPT table 12, and vice versa.

Figure 7:
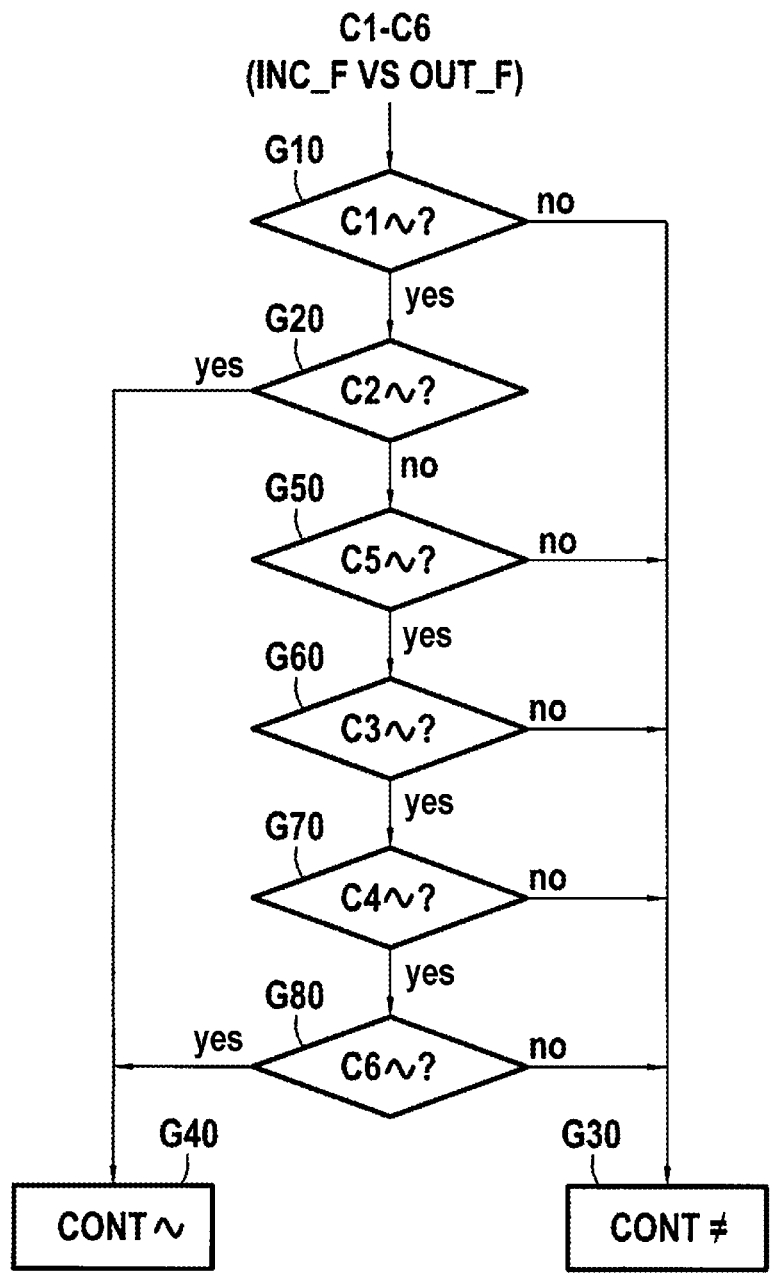
FIG. 7 illustrates, in flow diagram form, the comparisons made by the access point of FIG. 2.

This comparison is performed here according to a predetermined order illustrated in FIG. 7. Obviously, this order is given purely by way of illustration, and another order can be considered for comparing the characteristics C1 to C6.

The order retained for comparing the characteristics of the incoming and outgoing flows with one another illustrated in FIG. 7 is implemented here a first time to compare the characteristics C1 to C6 of the incoming flow INC_F (SELINP1) with the characteristics C1 to C6 of the outgoing flow OUT_F(SELINP2). If the result of this comparison is not that the flows INC_F(SELINP1) and OUT_F(SELINP2) convey an application content of the same kind, then the comparison is implemented a second time with the characteristics C1 to C6 of the incoming flow INC_F(SELINP2) and the characteristics C1 to C6 of the outgoing flow OUT_F(SELINP1).

As a variant, the two comparisons can be conducted in parallel or in succession by the comparison module 11C.

Only the comparison of the characteristics C1 to C6 of the incoming flow INC_F(SELINP1) with the characteristics C1 to C6 of the outgoing flow OUT_F(SELINP2) according to the order illustrated in FIG. 7 is detailed hereinbelow, the comparison of the characteristics C1 to C6 of the incoming flow INC_F(SELINP2) with the characteristics C1 to C6 of the outgoing flow OUT_F(SELINP1) being performed in the same way.

More specifically, in the comparison step F40, the comparison module 11C first of all compares the application protocols used by the incoming flow INC_F(SELINP1) and by the outgoing flow OUT_F(SELINP2) (characteristic C1). If the two application protocols are identical (i.e. the characteristics C1 memorized for the two flows for the time period T coincide) (answer yes to the step G10 of comparison of the characteristic C1), then the comparison module 11C goes on to compare the characteristics C2 of the incoming flow INC_F(SELINP1) and of the outgoing flow OUT_F(SELINP2) (step G20).

If the application protocols are different (answer no in the step G10 of comparison of the characteristics C1), the comparison module 11C of the access point 11 immediately detects that the application content conveyed is not of the same kind on the two flows considered and stops the comparison of the subsequent characteristics for these two flows (step G30). It then goes on to compare the flows INC_F(SELINP2) and OUT_F(SELINP1).

In the step G20 of comparison of the characteristics C2, the comparison module 11C determines whether the application signatures associated with the incoming flow INC_F(SELINP1) and with the outgoing flow OUT_F(SELINP2) are identical. Note that this comparison may require the taking into account of a time offset between the incoming flow and the outgoing flow. In effect, the delay in the routing of the packets received by the access point AP 11 via its WAN interface and intended for the bounce terminal T1 (these packets use a first entry of the NAPT table 12), the delay in the processing of these packets by the bounce terminal T1 (including, for example, the reading of the packet via the TCP/IP stack of the terminal T1, the possible extraction of information linked to the tunnel where appropriate, the retransmission of the packets to the TCP/IP stack of the terminal T1), then the delay in the routing of the packets from the terminal T1 to the access point AP 11 (these packets using a second entry of the NAPT table 12) can be reflected by a time offset of a few milliseconds to a few seconds that should be taken into account in this step.

If the application signatures are identical (answer yes to the comparison step G20), the comparison module 11C determines that the application contents conveyed on the incoming and outgoing flows considered are of the same kind and stops the comparison of the characteristics of these two flows (step G40).

If the application signatures C2 of the two flows are different (answer no to the comparison step G20), the comparison module 11C undertakes the comparison of the characteristics C5 of the flows INC_F(SELINP1) and OUT_F(SELINP2) representative of the periodicity of the data packets on the two flows (step G50). Note that different application signatures can be detected in particular if the memorizing module 11B has not managed to determine these signatures for the flows considered from the reference signature database that it has available.

If the comparison module 11C determines that the characteristics C5 of the two flows do not coincide (or are not identical) (answer no to the step G50), it deduces therefrom that the application contents conveyed on the two flows are not of the same kind and stops the comparison of the subsequent characteristics for these two flows (step G30). It then goes on to compare the flows INC_F(SELINP2) and OUT_F(SELINP1).

If the characteristics C5 of the flows coincide (answer yes to the step G50), the comparison module 11C undertakes the comparison of the characteristics C3 of the flows INC_F(SELINP1) and OUT_F(SELINP2) representative of the number of data packets conveyed on the two flows during the time period T (possibly taking into account a fragmentation) (step G60).

If the comparison module 11C determines that the numbers of packets C3 of the two flows do not coincide (or are not identical) (answer no to the step G60), it deduces therefrom that the application contents conveyed on the two flows are not of the same kind and stops the comparison of the subsequent characteristics for these two flows (step G30). It then goes on to compare the flows INC_F(SELINP2) and OUT_F(SELINP1).

If the characteristics C3 of the flows coincide (answer yes to the step G60), the comparison module 11C undertakes the comparison of the characteristics C4 of the flows INC_F(SELINP1) and OUT_F(SELINP2) representative of the size of the data packets conveyed on the two flows during the time period T (possibly taking account of a fragmentation) (step G70).

If the comparison module 11C determines that the packet sizes C4 of the two flows do not coincide (or are not identical) (answer no to the step G70), it deduces therefrom that the application contents conveyed on the two flows are not of the same kind and stops the comparison of the subsequent characteristics for these two flows (step G30). It then goes on to compare the flows INC_F(SELINP2) and OUT_F(SELINP1).

If the characteristics C4 of the flows coincide (answer yes to the step G70), the comparison module 11C undertakes the comparison of the characteristics C6 of the flows INC_F(SELINP1) and OUT_F(SELINP2) representative of the service differentiation information item contained in the packets (or DSCP marking) (step G80).

If the characteristics C6 of the flows coincide (answer yes to the step G80), the comparison module 11C determines that the application contents conveyed in the incoming and outgoing flows considered are of the same kind and stops the comparison of the characteristics of these two flows (step G40).

If the comparison module 11C determines that the characteristics C6 of the two flows do not coincide (or are not identical) (answer no to the step G80), it deduces therefrom that the application contents conveyed on the two flows are not of the same kind (step G30) and then goes on to compare the flows INC_F(SELINP2) and OUT_F(SELINP1).

Referring to FIG. 5, if, at the end of the comparison of the characteristics of the flows INC_F(SELINP1) and OUT_F(SELINP2), it is determined by the comparison module 11C that the application contents conveyed by these flows are not of the same kind, the comparison module 11C reiterates the steps G10-G80 illustrated in FIG. 7 on the flows INC_F (SELINP2) and OUT_F(SELINP1).

Note that the characteristics C1 to C6 and the flow diagram illustrated in FIG. 7 to test these characteristics are given only by way of illustration and are not limiting on the invention. For example, other characteristics can be envisaged for determining whether an incoming flow and an outgoing flow have an application content of the same kind, such as, in particular, the calculation of a checksum on the payload data of the packet (application data, in other words, after having eliminated, where appropriate, the header bytes linked to the tunneling). This type of characteristic makes it possible to easily compare the application contents of two flows to deduce therefrom whether they are or are not of the same kind. Otherwise, it informs the detection module 11D of the access point AP 11 of the detection of application contents of the same kind in the flows INC_F(SELINP1) and OUT_F(SELINP2) (answer yes to the test step F50). Likewise, if, at the end of the comparison of the flows INC_F (SELINP2) and OUT_F(SELINP1), the comparison module 11C identifies application contents of the same kind, it informs the detection module 11D of this (answer yes to the step F50).

This notification constitutes a detection of a risk of fraud by the detection module 11D within the meaning of the invention (step F70).

In the embodiment described here, following this detection, the detection module 11D activates the confirmation module 11E of the access point AP 11. The latter is configured to implement a procedure for confirming the actual existence of a fraud (test step F80). To better illustrate the invention, it is assumed here that it has been detected that the flows INC_F(SELINP1) and OUT_F(SELINP2) convey application contents of the same kind.

In the embodiment described here, to confirm (or deny) the existence of a fraud, the confirmation module 11E, through its insertion module 11E1, inserts, into the incoming flow INC_F(SELINP1) a predefined number K of packets comprising a predetermined marker, K denoting an integer greater than or equal to 1 (for example K=5).

Then it checks, by means of its checking module 11E2, whether these same marked packets are contained in the outgoing flow OUT_F(SELINP2). The checking module 11E2 can easily perform this check by means of the markers which have been inserted into the K=5 packets added by the access point AP 11 to the incoming flow INC_F(SELINP1).

If the checking module 11E2 detects the presence of the marked packets in the outgoing flow OUT_F(SELINP2), then the existence of a fraud is confirmed by the confirmation module 11E3 (answer yes to the step F80), which informs the detection module 11D thereof.

Otherwise, the existence of a fraud is denied by the confirmation module 11E3 (answer no to the step F80), and the detection module 11D is informed thereof. There is no follow up by the access point AP 11 to the detection of two incoming and outgoing flows conveying application contents of the same kind (step F90).

After having informed the detection module 11D, the access point AP 11, via its confirmation module 11E, deletes the marked packets from the flow.

In the embodiment described here, if the fraud is confirmed, the access point AP 11, via its detection module 11D, implements one or more corrective actions (step F100). These actions can be of different kinds. Thus, the detection module 11D can for example implement:
a deletion in the association table NAPT 12 of at least one of the entries of the pair of entries for which the result of the comparison step is that an incoming flow associated with one of the entries of the pair transports an application content of the same kind as an outgoing flow associated with the other entry of the pair;
a notification of the detection of the risk of fraud or of the fraud; and
a rebooting of the access point AP 11.

Obviously, other corrective actions can be envisaged as variants.

The invention thus proposes a simple and effective process that makes it possible to reinforce the security of the networks at the access point level, and to safeguard against the frauds that are based on bounce mechanisms.

In the embodiment described here, it has been assumed that a single IP address was allocated to the access point AP 11 on the WAN network NW2. As a variant, several distinct IP addresses can be allocated to the access point AP.

Moreover, in the embodiment described here, safeguarding against a fraud based on a single item of equipment of the local area network has been envisaged. As a variant, as described previously, several items of equipment could be involved in the bounce mechanism exploited by the fraud.

The invention can easily be applied to these two particular cases: to this end, it is sufficient to no longer limit the analysis to just the entries of the address association table corresponding to one and the same private IP address, but to take account of all the entries of the table in the memorizing and the comparing of the characteristics (i.e., the selection step therefore consists implicitly in selecting all the entries of the AP table 12). Note however that the entries are always compared in pairs in the comparison step (i.e., pairs of entries are then considered to which all the steps described previously for the entries SELINP1 and SELINP2 are individually applied), so as to determine whether there is at least one pair of entries out of all possible pairs of entries that can be formed, for which an incoming flow associated with one of the entries of the pair transports an application content of the same kind as an outgoing flow associated with the other entry of the pair. The existence of such a pair leads to a detection of a risk of fraud.

The invention claimed is:

1. A monitoring method implemented by an access point to a telecommunications network, the access point configured to maintain an address association table comprising at least one entry associating a public transport address with a private transport address, each transport address comprising an IP address and a port, the method comprising:
selecting at least two entries in the address association table;
memorizing at least one first characteristic obtained over a first period of time for each incoming flow and each outgoing flow associated with the selected entries;
comparing, for at least one pair of selected entries, of at least one characteristic memorized for an incoming flow associated with one of the entries of the pair with the at least one corresponding characteristic memorized for an outgoing flow associated with the other entry of the pair; and
detecting a risk of fraud upon determining, for at least one pair of entries, that an incoming flow associated with one of the entries of the pair transports an application content of the same kind as an outgoing flow associated with the other entry of the pair.

2. The method of claim 1, wherein selecting at least two entries in the address association table comprises selecting two entries corresponding to the same private IP address in the address association table.

3. The method of claim 1, wherein the at least one first characteristic memorized for a flow comprises at least one of:
- an application protocol used by the flow during the first time period;
- an application signature corresponding to the application content conveyed by the flow during the first time period;
- a number of data packets conveyed by the flow during the first time period;
- a size of data packets conveyed by the flow during the first time period; and
- a periodicity of the data packets conveyed by the flow over the first time period.

4. The method of claim 3, wherein the at least one characteristic memorized for a flow further comprises an item of service differentiation information contained in at least one data packet conveyed by the flow.

5. The method of claim 1, comprising, for at least one of the flows:
- extracting, from each data packet conveyed by the flow over the first time period, of a header and/or of at least a part of the payload data contained in the packet; and
- determining at least one characteristic memorized for the flow from the headers and/or the payload data extracted from the data packets conveyed by the flow.

6. The method of claim 5, further comprising:
- detecting, for the flow, of an encapsulation of the data packets conveyed by this flow in a tunnel; and
- de-encapsulating the data packets prior to the extracting.

7. The method of claim 1, further comprising implementing at least one corrective action in response to the detection of a risk of fraud.

8. The method of claim 7, wherein the at least one corrective action comprises at least one of:
- deleting, from the association table at least one of the entries of the pair of entries for which an incoming flow associated with one of the entries of the pair transports an application content of the same kind as an outgoing flow associated with the other entry of the pair;
- providing a notification of the detection of the risk of fraud; and
- rebooting the access point.

9. The method of claim 1, further comprising, in response to a detection of a risk of fraud, and for a pair of entries for which the result of the comparison step is that an incoming flow associated with one of the entries of the pair transports an application content of the same kind as an outgoing flow associated with the other entry of the pair:
- inserting at least one packet comprising a first marker into the incoming flow;
- detecting a presence or of an absence of the at least one marked packet in the outgoing flow; and
- upon detecting a presence of the at least one marked packet, confirming the existence of a fraud.

10. The method of claim 9, further comprising deleting the at least one marked packet after detecting a presence or of an absence of the at least one marked packet.

11. A computer comprising a processor and having stored thereon instructions which, when executed by the processor, cause the processor to implement the method of claim 1.

12. A non-transitory, computer-readable storage medium having stored thereon instructions, which when executed by a processor, cause the processor to implement the method of claim 1.

13. An access point to a telecommunications network, the access point configured to maintain an address association table comprising at least one entry associating a public transport address on the network with a private transport address, each transport address comprising an IP address and a port, the access point configured to:
- select at least two entries in the address association table;
- memorize at least one first characteristic obtained over a first time period for each incoming flow and each outgoing flow associated with the selected entries;
- compare, for at least one pair of selected entries, at least one characteristic memorized for an incoming flow associated with one of the entries of the pair with the at least one corresponding characteristic memorized for an outgoing flow associated with the other entry of the pair; and
- detecting a risk of fraud upon determining, for at least one pair of entries, that an incoming flow associated with one of the entries of the pair transports an application content of the same kind as an outgoing flow associated with the other entry of the pair.

14. The access point of claim 13, wherein the access point is configured to select entries corresponding to the same private IP address in the address association table.

15. The access point of claim 13, further configured to, upon detection of a risk of fraud for a pair of entries for which the access point determines that an incoming flow associated with one of the entries of the pair transports an application content of the same kind as an outgoing flow associated with the other entry of the pair:
- insert at least one packet comprising a first marker into the incoming flow;
- detect a presence or an absence of the at least one marked packet in the outgoing flow; and
- confirm the existence of a fraud upon detecting a presence of the at least one marked packet.

* * * * *